United States Patent Office 3,310,406
Patented Mar. 21, 1967

3,310,406
FOOD SPREAD
David P. Webster, 206 E. Maple Road,
Linthicum, Md. 21090
No Drawing. Filed Apr. 21, 1964, Ser. No. 361,595
16 Claims. (Cl. 99—1)

This application is a continuation-in-part of copending application Ser. No. 239,787 filed Nov. 23, 1962, and now abandoned.

This invention relates generally to a new food product. More particularly, the invention is concerned with the production of a new food product having a low ratio of saturated fats to unsaturated fats.

Presently there is great concern on the part of many people relative to high blood cholesterol level, and it is the opinion of some competent medical authorities that there is a positive relationship between such high blood cholesterol level and cardiovascular disease. It has been stated, for instance, that high blood cholesterol levels appear to foretell eventual cardiovascular disease and even act as contributing and causative agents in such disease. Undoubtedly for this reason, recent surveys indicate that an increasingly greater number of individuals are becoming concerned with regard to the cholesterol levels in their blood. Accordingly, due to this problem of high cholesterol levels in blood, it has been urged by many advanced thinking medical authorities that the diet of the public should be adjusted, in order to effect a lowering or prevention of a further rise in cholesterol levels in the blood. Dairy products, particularly cheeses, have been a substantial part of the diets of many individuals and have been attacked as a contributing factor to high cholesterol blood levels, since it is well known that such dairy products have a relatively high ratio of saturated fats to unsaturated fats, and to the intake of these saturated fats has been attributed the rise in cholesterol in the blood. Therefore, for those many individuals who are concerned over the cholesterol level in their blood and yet wish to continue enjoying foods such as cheese products without the possible harmful effects, a great need has arisen for a food product having a high ratio of polyunsaturated to saturated fats.

Accordingly, one of the principal objects of the present invention is to provide for the synthetic and economic production of a palatable combination of edible ingredients which have excellent taste and a pleasing texture which can be made, if desired, to duplicate the taste, texture and flavor of commonly known natural cheeses.

It is also an object of the present invention to provide for the production of a product which is high in energy and protein and also high in ratio of unsaturated fats to saturated fats.

Another object of the present invention is the production of a new food product including proteins, carbohydrates, and unsaturated fats to form a unique combination.

This invention also has for an object the product of a food product having a unique and appealing gloss.

These and other objects will become readily apparent upon a careful consideration of the following specification.

More specifically, a new food product has been found which contains a protein formed into a complex or compound when combined with a metal salt at a temperature of 140° to 190° F. in the presence of (a) vegetable oil or fat preferably containing unsaturated fats, (b) carbohydrate or starch hydrolyzate, and (c) moisture.

The protein portion of the composition may take a number of forms from any convenient source and may, for instance, be composed of animal proteins, such as cottage cheese curd, milk solids non-fat, skim milk solids, cereal protein from wheat, wheat germ, corn gluten, corn, oats, barley, etc., legume protein such as soybean, peanuts, or mixtures of any of these proteins. Cottage cheese curd has been found most desirable, though not essential. When the vegetable proteins are used, it is preferable that they be in combination with the milk proteins.

It has been found that the protein portion should approximate 35% to 60% by weight of the total composition, but the preferable weight range of the protein portion is 40% to 45%. When dried skim milk solids are used alone, the weight range of this ingredient should be 15% to 40%, with a desirable range of 25% to 35%, the reason being that dried skim milk solids are particularly rich in protein, and therefore less of this ingredient is required for the nutritious food product of the present invention.

The metal salts are important to the present invention, since they are believed to react or combine with the protein to form a complex or compound, the exact nature and composition of which has not yet been established, although alkali metal caseinate is believed to be at least part of the complex when the protein originates from milk. In the practice of this invention, any edible source of metal ion has been found satisfactory in combining with the protein. Specifically, the alkali metals, potassium and sodium, as well as the ammonium salts of chloride, phosphate, citrate, tartrate, and the like may be used. Among the phosphates the mono, di- and tri-basic phosphates, pyrophosphates, and hexametaphosphate are useful, and double alkali metal salts, such as sodium potassium tartrate, are equally workable. The amount of these salts should be between about 1% to 4% by weight of protein (dry basis), with 2% preferable. Greater amounts could be used if approved by the F.D.A.

It should be noted that the metal salts also impart an emulsifying action involving the oil or fat portion of the novel composition, which is in addition to the combination with the protein to thus assist the stabilizing action of the carbohydrate portion.

In order to effect the combination of the protein with metal salt, it has been found that the temperature of the ingredients should be between 140° to 190° F., while a range of 170° to 180° F. is preferred.

The oil or fat portion of the composition may be any vegetable oil, such as the peanut oils, soybean oil, cottonseed oil, cocoanut oil, palm oil, and the like; however, for the purpose of the present invention it is particularly desirable to utilize an oil in an amount between 5% to 30% of the total weight which possesses more polyunsaturated fats than saturated fats. There are two presently on the market which are known to meet this limitation—safflower oil and corn oil. Safflower oil, for example, has a ratio of 9 to 1 of polyunsaturates to saturates and contains approximately 75.1% linoleic fatty acid and oleic fatty acid about 15.7%, along with approximately 8.4% saturated fat. Corn oil, while not possessing as desirable a polyunsaturate to saturate ratio, nevertheless contains 55.4% linoleic acid and 29.3% oleic fatty acid, along with 10.4% saturated fat. Accordingly, while the proposed food product can be made with any vegetable oil, the superior characteristics of safflower oil and corn oil enable the food product, according to the present invention, to be an important factor in advanced dietary procedures.

In order to maintain a unitary mass of the various ingredients which include the protein portion and the oil and also to provide nutritious carbohydrates in the final product, it has been discovered that the starch hydrolyzate, corn syrup, is an important factor in producing a satisfactory food product. The starch hydrolyzate, while primarily stabilizing the water and preventing or retarding its loss from the final product, also adds gloss, palatability, and body texture to the food product.

It is not clear exactly how the corn syrup operates to produce the unique mass of all the ingredients; however, it is theorized that the corn syrup acts to physically bind or stabilize the moisture in the mixture at the same time that the formation of a paricular protein complex is accomplished by the reaction of the protein with the metal salt. It is also believed that the water present in the composition is attracted and held by the corn syrup at this time, thus maintaining a proper consistency of the overall product. Further, it is believed likely, though not confirmed, that the corn syrup envelopes or absorbs not only the oil and water, but also the protein, to tightly hold the protein within the product.

As previously mentioned, the incorporation of the corn syrup produces an unusual and appealing gloss to the product. It is believed that this unexpected gloss is the result of the even distribution of the ingredients, brought about by the presence of the corn syrup.

According to the present invention, any starch hydrolyzate obtained from a corn refining process may be used to advantage; however, it has been found that starch hydrolyzate having a dextrose equivalent (D.E.) of greater than 28 is particularly useful. Such starch hydrolyzates having greater than a 28 D.E. are usually referred to as corn syrups. Corn syrups are normally classed as a low conversion, regular conversion, intermediate conversion, or high conversion type, which is clearly indicated by the dextrose equivalent. The high conversion syrups have a D.E. of from 58 to 67 and are further classified as acid-conversion and acid-enzyme (dual-conversion) syrups, depending upon the method of manufacture.

While it has been found that all of the corn syrups are unexpectedly effective, according to the present invention, the low conversion type having a D.E. of 28 to less than 38 is particularly useful, for the reason that more of this corn syrup can be used without producing an undesirable sweetness. It is, of course, desirable to use as much of the corn syrup as is practical, due to the fact that the corn syrup is a rich source of carbohydrates. Therefore, it should be clear that the lower the conversion (D.E.) of the starch into sugar, the more carbohydrate there is remaining as starch, and, also, the less sugar present to add an undesirable excess sweetness to the product. The physical characteristics and further information concerning the properties of the various corn syrups may be found in Corn Syrups and Sugars, 2d edition, 1958, by Corn Industries Research Foundation, Washington, D.C.

It has further been found that a corn syrup that has been subjected to the well known ion exchange process, in order to remove nearly all traces of mineral and nitrogenous matter, is an especially desirable type of corn syrup, since it is more bland in flavor and exhibits greater resistance to discoloration. The difference between the syrups which have passed through an ion exchange and those which have not has been described in Unit Processes In Organic Synthesis, edition 1938, page 612.

A corn syrup of low conversion is composed primarily of dextrose and polysaccharides, together with smaller amounts of maltose and trisaccharides. These trisaccharides and other polysaccharides are polymers consisting of glucopyranoside units joined by 1-4,alpha-glucose linkages. While the polysaccharides will vary with respect to the number of glucopyranoside units, the number of these units will normally range from 4 to 15. These glucopyranoside polysaccharides are also characterized by their water solubility. In the low conversion syrups the dextrose varies from 9.3 to 14.7, the maltose from 8.6 to 12, the glucotrisaccharides from 8.0 to 10.5 and the glucopyranoside-polysaccharides from 74.7 to 62.8.

The weight percentages of the full range of corn syrups, according to the present invention, vary from 5 to 30% of the total. In general, about 12 to 14% has been found to be most desirable.

While the corn syrup, when added to the ingredients, is believed to normally act as a stabilizer, it may be desirable to add other stabilizing ingredients, such as the vegetable gums, such as carboxymethylcellulose, gelatin, algins, alginates, or sodium alginate. These stabilizers generally will be added in an amount up to about 1%.

The amount of water added to the composition greatly depends upon the type of product which is desirable. For example, high solids content up to 55% would produce a more firm, sliceable product; whereas, a 30% solids composition (70% water) would be softer and more like the well known dip-type products. Generally, a range between 40% and 45% solids is desirable. The water present is normally in the range of 2.5% by weight to 50.5%.

One of the unique features of the present invention is that suitable flavorings can be added to the composition to duplicate the taste and color of the natural cheeses. For instance, the cheddar, bleu cheese, or Swiss flavoring can be added and the resultant product will simulate, when desired, very closely the taste, texture and color of the original natural product. Furthermore, other flavoring materials, such as leeks, garlic, smoke, pimento, and the like may be used.

The method of making the product, according to the present invention is simple and is as follows:

(1) Blend in vat all ingredients in amounts set forth in examples.

(2) Start heating with thorough agitation.

(3) Heat to 180° F. and agitate until all ingredient particles are dissolved and in suspension. Add cheese flavor and color as desired.

(4) Homogenize at about 1000 pounds per square inch pressure.

(5) Package and cool.

(6) Store at 40° F. (Steps 4 to 6 are optional.)

Types, formulas and samples of the composition of the present invention, produced according to the above method, are as follows:

(1) *Sliceable product*

| | Parts |
|---|---|
| (1) Corn oil | 20 |
| (2) Cottage cheese (dry curd) | 60 |
| (3) Corn syrup, low D.E. | 14 |
| (4) Sodium phosphate | 2 |
| (5) Salt | 1 |
| (6) Stabilizer (algin) | 0.5 |
| (7) Water | 2.5 |

(2) *Sliceable product*

| | Parts |
|---|---|
| (1) Corn oil | 15 |
| (2) Cottage cheese curd | 45 |
| (3) Non-fat dry milk, or one of the vegetable proteins | 25 |
| (4) Corn syrup | 11 |
| (5) Sodium citrate | 3 |
| (6) Water | 1 |

(3) *Dip-type product*

| | Parts |
|---|---|
| (1) Corn oil | 20 |
| (2) Milk solids non-fat | 20 |
| (3) Corn syrup, low D.E. | 14 |
| (4) Sodium potassium tartrate | 2 |
| (5) Salt | 1 |
| (6) Stabilizer (gelatin) | 0.5 |
| (7) Water | 42.5 |

The above formulas were also mixed with safflower oil substituted for the corn oil with similar results. Any of the metal salts may be substituted for the metal salts mentioned in these examples. Also, any of the above-mentioned flavorings may be added as desired.

From the foregoing detailed description, it will be evident that there are a number of changes, adaptations, and modifications of the present invention which come within the province of those skilled in the art; however, it is intended that all such variations not departing from the spirit of the invention, be considered as within the scope thereof as limited solely by the appended claims.

I claim:

1. A food product comprising at least 5% by weight vegetable oil containing polyunsaturated fats, at least 15% by weight protein-containing material, 2.5%–70% by weight, water, sufficient corn starch hydrolyzate to act as a binder for said food product, and sufficient amount of metal salt to combine with the protein said amount being approximately 1%–4% by weight protein, said metal salt and said protein combined in the form of a metal protein complex.

2. The food product of claim 1, wherein the vegetable oil is selected from the group consisting of corn oil and safflower oil.

3. The food product of claim 1, wherein the protein is selected from the group of animal and vegetable proteins consisting of milk solids, non-fat, dry curd cottage cheese, skim milk, soybean solids, peanut solids, corn gluten, wheat germ, oats, and barley.

4. The food product of claim 1, wherein the corn starch hydrolyzate is present in an amount of at least 5% by weight, and the metal salt is selected from the group consisting of sodium, potassium, and ammonium ions.

5. The food product of claim 1, wherein the corn starch hydrolyzate is a corn syrup having a D.E. of at least 28.

6. The food product of claim 1, wherein the corn starch hydrolyzate has a D.E. of 28 to 37.

7. A food product comprising 5% to 30% by weight vegetable oil containing polyunsaturated fats, 5% to 30% corn starch hydrolyzate, 15% to 60% protein-containing material, 2.5%–70% water, and sufficient metal salt to combine with the protein said amount being approximately 1%–4% by weight protein, said metal salt and said protein combined in the form of a metal protein complex.

8. The food product of claim 7, wherein the vegetable oil is selected from the group consisting of corn oil and safflower oil.

9. The food product of claim 7, wherein the protein is selected from the group of animal and vegetable proteins consisting of milk solids non-fat, dry curd cottage cheese, skim milk, soybean solids, peanut solids, corn gluten, wheat germ, oats, and barley.

10. The food product of claim 7, wherein the starch hydrolyzate is a corn syrup having a D.E. of at least 28.

11. A food product comprising 5% to 30% by weight vegetable oil containing polyunsaturated fats selected from the group consisting of corn oil and safflower oil, 15% to 60% protein selected from the group consisting of milk solids non-fat, dry curd cottage cheese, sodium caseinate, skim milk, soybean solids, peanut solids, corn gluten, oats, barley, and wheat germ, 5% to 30% corn syrup starch hydrolyzate having a D.E. of 28 to 37, and sufficient metal salt to combine with the protein, and 2.5%–70% water.

12. The food product of claim 1, wherein the metal salt is selected from the group of metals consisting of potassium, sodium, and ammonium chlorides, phosphates, citrates, and tartrates.

13. The food product of claim 3, wherein the skim milk is present in an amount by weight between 15% and 40%.

14. A food product comprising at least 5% by weight vegetable oil containing polyunsaturated fats, at least 15% by weight sodium caseinate, and sufficient corn syrup to bind the food product.

15. The process of preparing a food product comprising: mixing at least 15% by weight of protein with a metal salt in the amount of 1%–4%, based on the amount of protein, in the presence of 5%–30% corn syrup, 5%–30% vegetable oil containing polyunsaturated fats, and 2.5%–70% water, heating the mixture to a temperature of 140° to 190° F., and at that temperature forming a metal protein complex.

16. The process of claim 15, wherein the protein is present in the amount of 15% of the total weight and is selected from the group of animal and vegetable proteins consisting of milk solids non-fat, dry curd cottage cheese, skim milk, soybean solids, peanut solids, corn gluten, wheat germ, oats and barley, and the metal salt is selected from the group of metals consisting of potassium, sodium, and ammonium chlorides, phosphates, citrates, and tartrates.

References Cited by the Examiner

UNITED STATES PATENTS

| | | | |
|---|---|---|---|
| 2,278,466 | 4/1942 | Musher | 99—1 |
| 2,319,187 | 5/1943 | Ingle | 99—115 |
| 2,617,730 | 11/1952 | Long et al. | 99—117 |
| 2,634,212 | 4/1953 | Komarik | 99—140 |
| 2,730,447 | 1/1956 | Boyer | 99—14 |
| 2,882,168 | 4/1959 | Rossi | 99—117 X |
| 3,102,031 | 8/1963 | MacAllister et al. | 99—17 |

FOREIGN PATENTS 852,908  11/1960  Great Britain.

A. LOUIS MONACELL, *Primary Examiner.*

M. W. GREENSTEIN, *Assistant Examiner.*